United States Patent [19]
Mödinger et al.

[11] Patent Number: 5,443,222
[45] Date of Patent: Aug. 22, 1995

[54] BELT RETRACTOR WITH A BELT PRETENSIONER ACTING ON THE BELT DRUM

[75] Inventors: Thomas Mödinger, Aldorf-Vordersteinenberg; Johannes Schmid, Schwäbisch Gmünd-Hussenhofen, both of Germany

[73] Assignee: TRW Repa GmbH, Aldorf, Germany

[21] Appl. No.: 88,823

[22] Filed: Jul. 8, 1993

[30] Foreign Application Priority Data

Jul. 13, 1992 [DE] Germany .................. 42 22 993.6

[51] Int. Cl.⁶ .............................................. B60R 22/46
[52] U.S. Cl. ..................................... 242/374; 242/379.1
[58] Field of Search ......... 242/107, 107.4 R, 107.4 A, 242/107.4 B, 374, 379.1; 280/806; 297/478, 480

[56] References Cited

U.S. PATENT DOCUMENTS

| | | |
|---|---|---|
| 3,386,683 | 6/1968 | Howland . |
| 4,014,479 | 3/1977 | Nilsson et al. . |
| 4,162,773 | 7/1979 | Wallin . |
| 4,381,084 | 4/1983 | Fohl ........................... 242/374 |
| 4,423,846 | 1/1984 | Fohl ........................... 242/107 |
| 4,434,953 | 3/1984 | Gemar et al. ................ 242/374 |
| 5,344,095 | 9/1994 | Frei ............................ 242/374 |

FOREIGN PATENT DOCUMENTS

| | | |
|---|---|---|
| 3220498 | 12/1983 | Germany . |
| 3040667 | 5/1991 | Germany . |
| 2191933 | 12/1987 | United Kingdom . |

OTHER PUBLICATIONS

Abstract of Japanese Publication No. JP3045446 to Tetsuo, published Feb. 27, 1991.

*Primary Examiner*—John M. Jillions
*Attorney, Agent, or Firm*—Tarolli, Sundheim & Covell

[57] ABSTRACT

The belt retractor with a belt pretensioner acting on the belt drum (12) has a pyrotechnical piston and cylinder linear drive (22). A rack (32) adapted to be subjected to thrust is connected with the piston (28) of such linear drive (22). The rack (32) is able to be drivingly coupled with the belt drum by the intermediary of a step-up gear wheel transmission (34, 36, 44). After tensioning of the belt, tensions in the safety belt system are limited by plastic deformation of a torsion rod (38), and peak strain values are decreased.

The belt retractor is integrated with the belt pretensioner and the energy converter as a compact assembly.

8 Claims, 4 Drawing Sheets

BELT RETRACTOR WITH A BELT PRETENSIONER ACTING ON THE BELT DRUM

BACKGROUND OF THE INVENTION

The present invention relates to a belt retractor for vehicle safety belts, comprising a belt pretensioner acting on the belt drum and having a linear drive, and a transmission means for converting the linear movement of the linear drive into a rotary movement.

Such a belt retractor is integrated with the belt pretensioner as a single assembly. In U.S. Pat. 4,423,846 a number of designs of such an assembly are described. On tripping the belt pretensioner the movement of the piston of the pyrotechnical linear piston and cylinder drive unit is transmitted via a cable to a pulley whose periphery is engaged by the cable. This pulley is then caused to rotate by the tension exerted by the cable and at the start of such rotation it is drivingly coupled with the belt drum. The cable and the pulley constitute a transmission means for converting the stroke of the piston into rotation of the belt drum. Owing to the rotation of the belt drum there is a tightening of the belt webbing. The angle of rotation necessary for a sufficient tightening of the belt requires a relatively large stroke of the piston. The cylinder of the piston and cylinder unit has to be made with a corresponding length so that the assembly consisting of the belt retractor and the belt pretensioner needs a correspondingly large amount of space in the vehicle.

SUMMARY OF THE INVENTION

A primary object of the present invention is to improve a belt retractor of the type referred to above so that a short working stroke of the linear drive is sufficient to achieve the desired pretensioning of the webbing, thus permitting a more compact design of the retractor/pretensioner unit.

In the belt retractor of the present invention transmission means are provided which are able to be coupled drivingly with said belt drum by the intermediary of a step-up gear transmission. A toothed gearing allows a conversion of a short driving stroke of the linear drive into a rotary movement of the belt drum through an angle of rotation sufficient for tightening the belt. In accordance with a preferred embodiment of the invention, the toothed gearing consists of a first gear wheel following the transmission means and a second gear wheel which meshes with the first gear wheel and is able to be coupled with the belt drum via a freewheel coupling, preferably a locking transmission with rolling elements.

A simple transmission means is constituted by a pulley and a cable which engages the periphery of the pulley and is connected with the linear drive. Particularly low losses are achieved by a transmission means which is constituted by a rack connected with the linear drive and a pinion meshing with the rack.

Various types of linear drives are suitable for use with the invention. By way of example, the linear drive is constituted by a piston and cylinder drive having a gas generator, with the cylinder in particular bearing on the retractor housing. Owing to the short stroke of the piston, the cylinder of the piston and cylinder drive only extends a short distance past the load bearing retractor housing so that the assembly consisting of the belt retractor and the belt pretensioner hardly needs any more space than a belt retractor of the same design but without a belt pretensioner. An especially advantageous structural design results when in accordance with the preferred embodiment the rack which is adapted to be loaded with thrust is rigidly connected with the piston and is slidably guided in parallelism to the floor of the retractor housing, which is generally U-shaped in cross-section.

Upon a collision of the vehicle, tensioning of the belt takes place firstly, and then the vehicle occupant is thrown forward so that a high strain may be produced in the belt webbing. In order to reduce the risk of injury it is desirable for the strain to be limited and for the peak values of the strain to be decreased by energy conversion. For this to be possible the belt webbing must be able to be pulled off from the belt drum against predetermined holding force. In the case of the preferred working embodiment the second gear wheel is adapted to be coupled via a freewheel coupling with the first end of a torsion rod, whose second end bears on the housing of the belt retractor in such a manner as to prevent relative rotation. When, after tensioning of the belt, the belt webbing is subjected to a high tension load, the belt drum will be turned in the direction of belt webbing pay off and its rotary movement is transmitted via the second gear wheel to the first gear wheel, which is however coupled in such a manner as to prevent relative rotation with the first end of the torsion rod via the freewheel coupling. Since the second end thereof bears on the housing of the belt retractor in such a manner as to prevent relative rotation, on further rotation of the belt drum in the direction of pay off of the belt the torsion rod will be twisted. Owing to the plastic deformation of the torsion rod now occurring the strain in the belt webbing is limited, and the peak energy values are decreased by energy conversion. The danger of injury for the occupant of the vehicle is substantially reduced owing to this design of the belt retractor/belt pretensioner/energy converter combination.

BRIEF DESCRIPTION OF THE DRAWINGS

Further features and advantages of the invention will be apparent from the following description of two preferred working embodiments and from the drawings, to which reference is made and in which.

DESCRIPTION OF THE PREFERRED EMBODIMENTS

Figure 1:
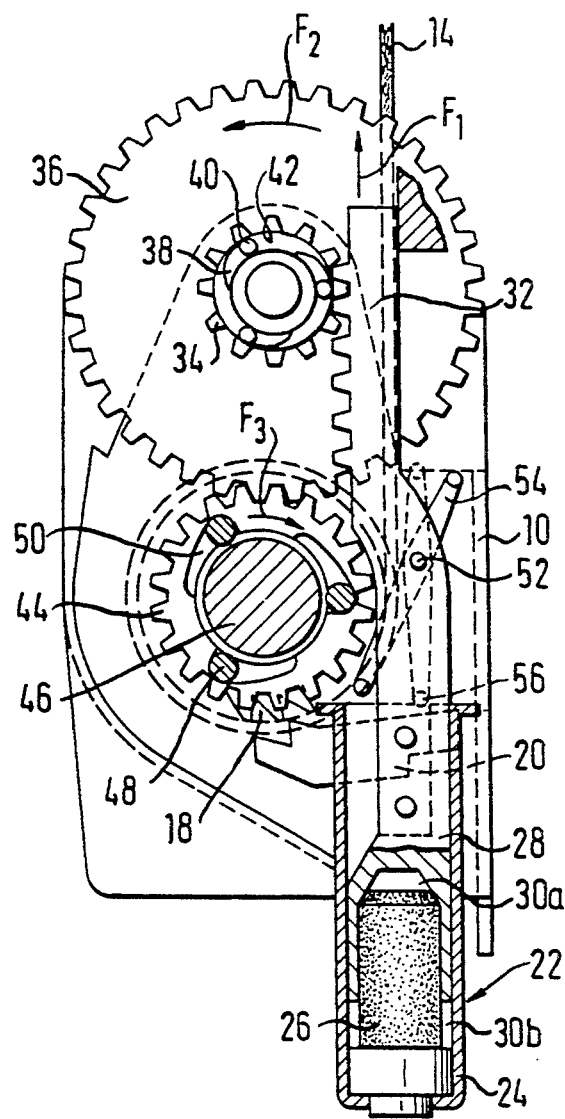
FIG. 1 is a diagrammatic side elevation of an assembly consisting of a belt retractor and a belt pretensioner according to a first embodiment of the invention, with which an energy converter for limiting strains in the safety belt system has been integrated.

A belt drum 12 is rotatably supported in a load bearing belt retractor housing 10 which in cross section is generally U-shaped. The belt webbing 14 wound up on the belt drum 12 emerges from the belt retractor in parallelism to the bottom or floor of the housing 10 of the belt retractor. The belt retractor is provided with a locking mechanism, whose control system, which is conventional and is consequently not described in detail, is accommodated in a housing cover 16 on the one side of the housing 10 of the belt retractor. The locking mechanism consists of locking teeth on the flanges of the belt drum 12, of which in FIG. 1 two teeth 18 will be seen, and at least one pawl 20 pivoted in a load bearing manner on the housing 10 of the belt retractor and designed for cooperation with the ratchet teeth on the flange of the belt drum.

Figure 2:
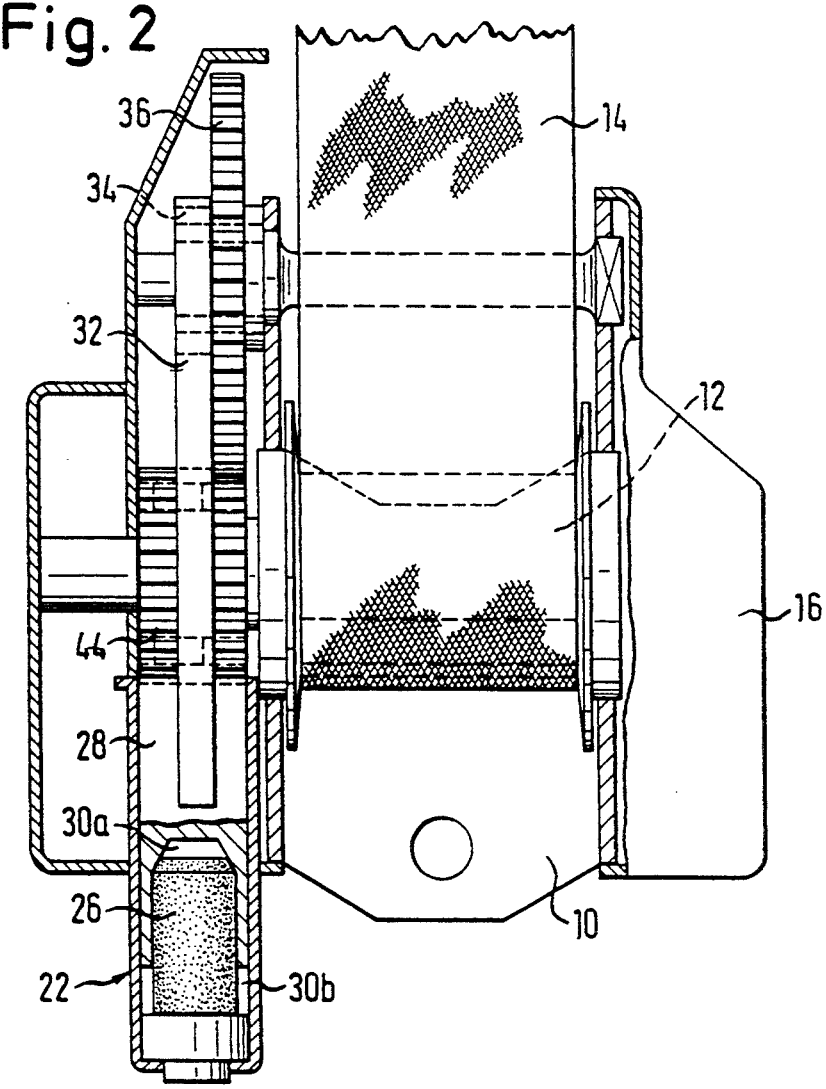
FIG. 2 is a diagrammatic plan view of the design illustrated in FIG. 1.
Figure 3:
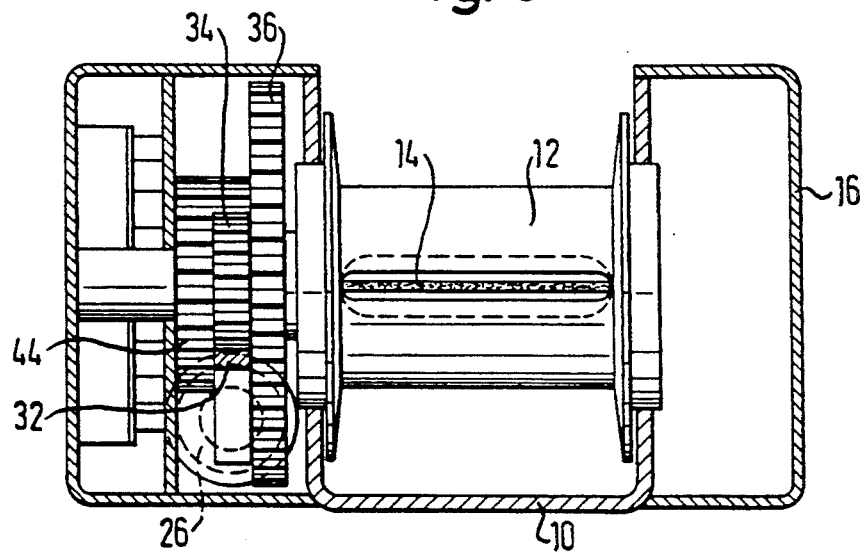
FIG. 3 is a diagrammatic cross sectional view of the design illustrated in FIGS. 1 and 2.

According to FIGS. 1 to 3, on the side opposite the housing cover and on the floor of the housing 10 of the belt retractor a pyrotechnical piston and cylinder linear drive is arranged, which is generally referenced 22. It consists of a cylinder 24 projecting partly from the housing 10 of the belt retractor, a pyrotechnical gas generator 26 mounted in the free end of the cylinder 24 and a piston 28 sliding in the cylinder 24. The piston 28 is designed in the form of a cup and is slipped over the cylindrical gas generator 26, two working chambers 30a and 30b being constituted.

A rack 32 is rigidly connected with the piston 28. The rack 32 is guided for movement in parallelism to the floor of the housing 10 of the belt retractor. The teeth of the rack 32 mesh with a pinion 34 in the neutral position illustrated in FIG. 1, such pinion 34 being connected permanently with a gear wheel 36 having a larger diameter. The transmission means, which is constituted by the pinion 34 meshing with the rack 32 and which converts the linear movement of the piston 28 into a rotary movement, is rotatably mounted via the gear wheel 36 on the first axial end of a torsion rod 38, whose opposite end is fixed and locked against rotation in the adjacent side wall of the housing 10 of the belt retractor. The gear wheel 36 is able to be coupled via a freewheel coupling in the form of a rolling element locking transmission having rolling elements 40 on the adjacent end of the torsion rod 38. The preferably roller-like rolling elements 40 are received in recesses in the outer periphery of the adjacent end of the torsion rod 38, which are limited respectively by a ramp surface 42.

The gear wheel 36 meshes with a further gear wheel 44 with a smaller diameter. This gear wheel 44 is rotatably supported on the outer periphery of an axial coupling projection 46 of the belt drum 12. Between the gear wheel 44 and the coupling projection 46 a freewheel coupling is arranged, which is constituted by a rolling element locking transmission with roller-like rolling elements 48. The rolling elements 48 are received by recesses 50 delimited by ramp surfaces, of the gear wheel 44.

The rack 32 is able to be shifted between two extreme positions, in which its teeth are out of engagement with the teeth of the pinion 34. By means of the rack 32 a lever 54, which is pivoted on a bearing pin 52 on the housing 10 of the belt retractor, is able to be shifted between a first position shown in continuous lines in FIG. 1 and a position as shown is broken lines. In the resting or neutral position (as illustrated in continuous lines) the lever 54 assumes a position which is oblique in relation to the rack 32. By moving the rack 32 out of the rest position illustrated in FIG. 1 the lever 54 is pivoted into a position parallel to the rack 32, and a headpiece 56 on its end fits over the pawl 20 so that the same is prevented from coming into engagement with the locking or ratchet teeth 18 on the belt drum 12.

On activation of the gas generator 26 by a control system (not illustrated), the working chambers 30a and 30b are acted upon by gas under pressure and the piston 28 is moved forward in the cylinder 24, the rack 32 also being shifted forward. The rack 32 in mesh with the pinion 34 now causes a rotary movement of this pinion so that the gear wheel 36 is caused to rotate as well. The forward movement of the rack 32 is indicated in FIG. 1 by an arrow $F_1$. The rotation of the gear wheel 36 as caused by the forward movement of the rack 32 is indicated by an arrow $F_2$. The freewheel coupling arranged between the torsion rod 38 and the gear wheel 36 allows rotation in the direction indicated by the arrow $F_2$ but locks in the opposite direction of rotation.

The rotation of the gear wheel 36 also causes rotation of the gear wheel 44 in mesh with it. The corresponding direction of rotation is indicated by an arrow $F_3$ in FIG. 1. On rotation of the gear wheel 44 in the direction of this arrow $F_3$ the freewheel coupling arranged between the gear wheel 44 and the coupling projection 46 will lock so that the rotation of the gear wheel 44 is transmitted to the coupling projection 46. The belt drum 12 is now caused to rotate, the belt webbing 14 being rolled up so that the safety belt system is freed of belt slack. Since the gear wheel 36 has a substantially larger diameter than the gear wheel 44, the forward or feed movement of the rack 32 is converted by a step-up gear transmission into a large angle of rotation of the belt drum 12. This gear transmission is one having a low loss so that the drive energy available from the pyrotechnical gas generator 26 is effectively employed.

If after tensioning of the belt there is a high tension in the belt webbing 14, the belt drum 12 will tend to rotate in the direction of belt pay off. The relative direction of rotation between the coupling projection 46 and the gear wheel 44 in this case remains the same in relation to the operation of drawing the belt tight so that the freewheel coupling remains locked. The rotation now occurring of the gear wheel 44 is a direction opposite to the direction denoted as $F_3$ is transmitted to the gear wheel 36, the freewheel coupling between this gear wheel 36 and the adjacent end of the torsion rod 38 now being locked so that the torsion rod will oppose the rotation of the gear wheel 36. However when the strain exceeds a predetermined level the torsion rod 38 will undergo torsional deformation, plastic work of deformation being performed. The torsion rod 38 thus constitutes an energy conversion means, by which the strain in the belt webbing is limited and peak strain values are decreased. Dependent on the opposite force of the belt system to be overcome during the operation of belt tensioning it is possible for the rack 32 to be moved forwards into its extreme position, in which it is out of engagement with the pinion 34 or is even stopped before such extreme position. In the latter case the rack 32 is moved back during the rotation of the gear wheel 36 by the pinion 34 connected with it until it has reached its opposite extreme position, in which its teeth are out of engagement with the pinion 34. The rotation of the gear wheel 36 with simultaneous plastic deformation of the torsion rod 38 is for this reason not impeded by the rack 32, which may not be moved to an unlimited degree in relation to the housing 10 of the belt retractor. The lever 54 remains in its pivoted position after tripping of the belt pretensioner, in which position it holds the pawl 20 out of engagement with the locking or ratchet teeth 18 of the belt drum 12.

In the case of an alternative working embodiment there is no torsion rod 38 if no conversion of energy is called for. The gear wheel 36 is in this case able to be coupled with a locking element rigidly anchored on the housing 10 of the belt retractor by means of the rolling elements 40, which locking element may be designed in the same manner as the end illustrated in the drawing of the torsion rod 38. After tensioning of the belt the pawl 20 is in any case kept untripped, since at this point in time a sudden reversal of the direction of rotation of the belt drum occurs and it might be transmitted with such an angular acceleration that reliable engagement of the pawl would not be certain.

Figure 4:
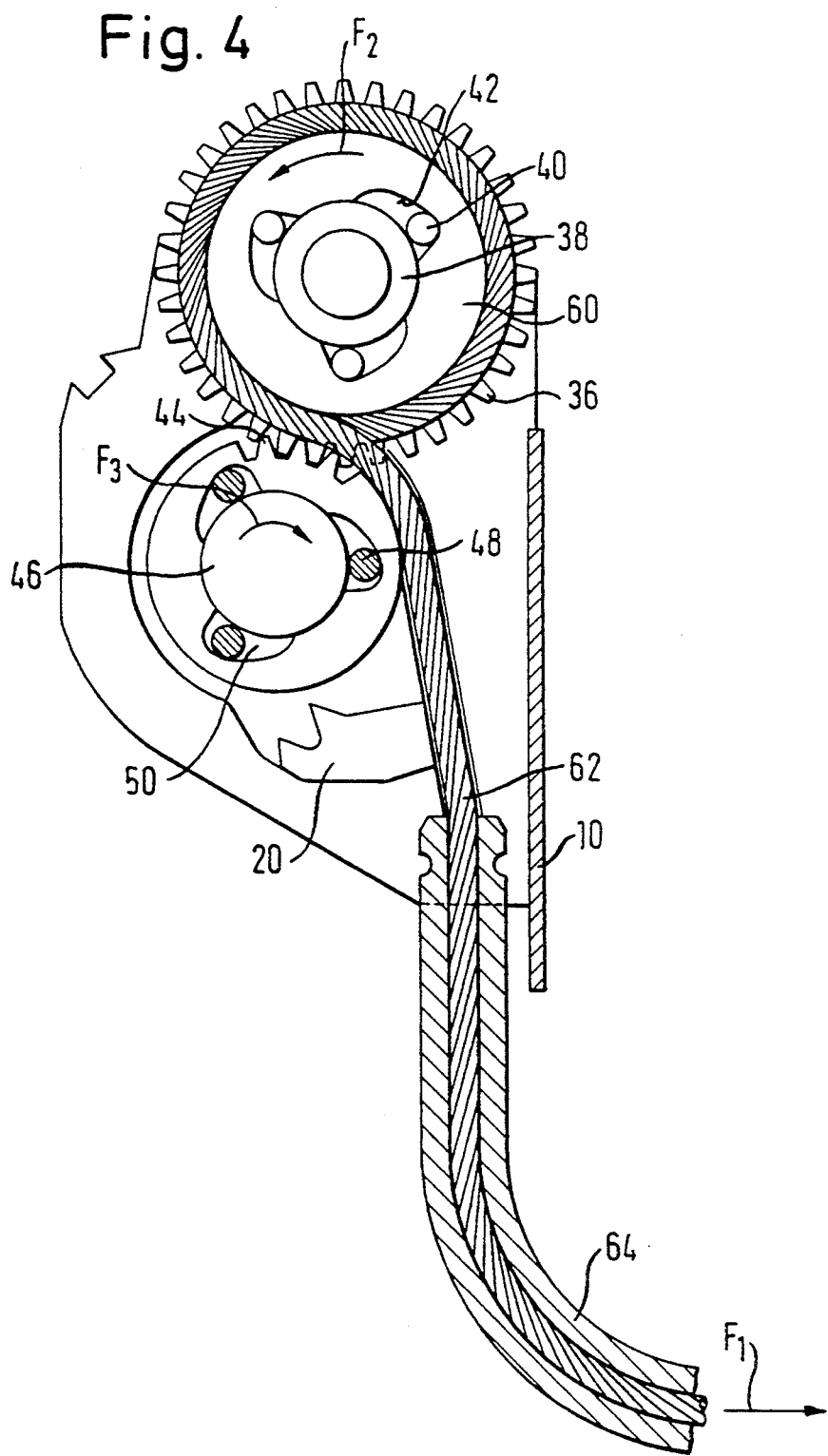
FIG. 4 is a diagrammatic side elevation of an assembly consisting of a belt retractor and a belt pretensioner according to a second embodiment of the invention.
Figure 5:
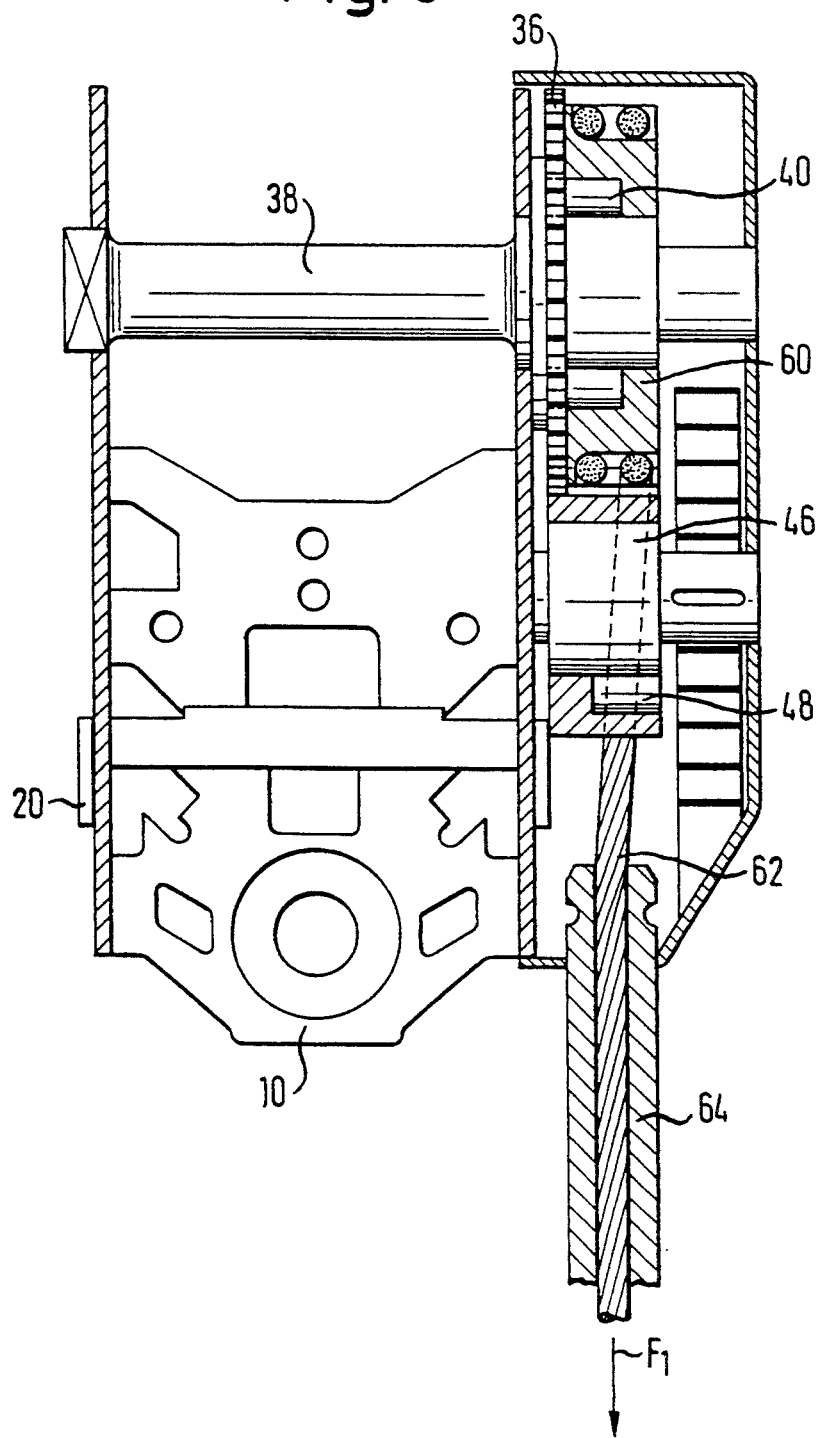
FIG. 5 is a diagrammatic sectional view of the design illustrated in FIG. 4, without a belt drum.

In FIGS. 4 and 5 a further embodiment of a belt retractor cum belt pretensioner is illustrated. It differs from the first embodiment shown in FIGS. 1 to 3 in that the transmission means is not constituted by the pinion 34 and the rack 32 but by a pulley 60 and a cable 62 engaging the periphery of the pulley 60. Further, the linear drive, not shown here, is not disposed at the belt retractor housing 10. The linear drive may consist of a remotely arranged piston and cylinder drive having a gas generator or may be derived from the relative movement of a vehicle unit to the vehicle body by the intermediary of a cable in the event of a collision of the vehicle. The cable 62 is connected with the linear drive via a Bowden cable.

The pawl 20 may be held in an inactive position in a manner analogous to the first embodiment or for example by a control unit (not shown), which is connected with the cable 62. In other respects, the second embodiment is designed to be in correspondence with the first embodiment.

We claim:

1. A belt retractor for vehicle safety belts comprising:
   a housing;
   a belt drum rotatably mounted in said housing;
   a linear drive for providing a linear drive stroke;
   an intermediate wheel rotatably supported on said housing;
   conversion means for converting said linear drive stroke into rotation of said intermediate wheel to cause said intermediate wheel to rotate at a first rate;
   a step-up gear having an input connected with said intermediate wheel and an output connected with said belt drum for transmitting rotation of said intermediate wheel to said belt drum to rotate said belt drum at a second rate substantially higher than said first rate; and
   a freewheel coupling for coupling said intermediate wheel with a first end of a torsion rod which has a second end supported by said housing to be constrained in rotation.

2. The belt retractor as set forth in claim 1, wherein said step-up gear comprises a first gear wheel connected to said intermediate wheel and a second gear wheel meshing with said first gear wheel, and including a freewheel coupling for coupling said second gear wheel with said belt drum.

3. The belt retractor as set forth in claim 2, wherein said intermediate wheel is formed by a pulley connected with said first gear wheel in such a manner as to prevent relative rotation, and including a cable which engages the periphery of said pulley and is connected to said linear drive.

4. The belt retractor as set forth in claim 2, wherein said intermediate wheel is provided with an integral drive pinion and said linear drive has an output member provided with a rack meshing with said drive pinion.

5. The belt retractor as set forth in claim 4, wherein said linear drive comprises a piston and a cylinder connected to said housing, said housing having a pair of spaced flanges and a bottom wall interconnecting said flanges, said output member being formed of a rigid rod provided with said rack and connected to said piston, and said rod being guided to move with a linear stroke parallel to said bottom wall.

6. The belt retractor as set forth in claim 1, wherein said linear drive is formed by a piston and cylinder drive having a pyrotechnical gas generator.

7. The belt retractor as set forth in claim 1, wherein said belt drum has integral blocking teeth and a blocking pawl is pivotally mounted on said housing for selective blocking engagement with said blocking teeth, and said blocking pawl being constrained in a disabled position spaced from said blocking teeth upon activation of said linear drive.

8. The belt retractor as set forth in claim 5, wherein said rack is formed by a series of spaced teeth arranged on a predetermined section of said rod, said predetermined rod section moving past and out of engagement with said drive pinion when said rod has reached an end position.

* * * * *